April 8, 1941.  C. FERRO  2,237,481

VEHICLE WHEEL

Filed Feb. 13, 1940  4 Sheets-Sheet 1

INVENTOR
Casimiro Ferro
BY
Wooster & Davis
ATTORNEYS.

April 8, 1941.  C. FERRO  2,237,481

VEHICLE WHEEL

Filed Feb. 13, 1940  4 Sheets-Sheet 2

INVENTOR
Casimiro Ferro
BY
Wooster & Davis
ATTORNEYS

April 8, 1941.  C. FERRO  2,237,481

VEHICLE WHEEL

Filed Feb. 13, 1940  4 Sheets-Sheet 3

INVENTOR
Casimiro Ferro
BY
Wooster & Davis
ATTORNEYS

April 8, 1941.  C. FERRO  2,237,481
VEHICLE WHEEL
Filed Feb. 13, 1940  4 Sheets-Sheet 4

INVENTOR
Casimiro Ferro
BY
Wooster & Davis
ATTORNEYS

Patented Apr. 8, 1941

2,237,481

UNITED STATES PATENT OFFICE 2,237,481

VEHICLE WHEEL

Casimiro Ferro, West Brighton,
Staten Island, N. Y.

Application February 13, 1940, Serial No. 318,671

11 Claims. (Cl. 301—35)

This invention relates to vehicle wheels, particularly wheels for motor vehicles such as automobiles, trucks, tractors and the like, and has for an object to provide a wheel having improved attaching means by which the detachable section of the wheel can be quickly and easily disconnected and removed and as easily reapplied and attached.

Another object is to provide a construction in which the wheel can be easily and quickly detached and removed without disconnecting the attaching means from the permanently mounted or supporting part of the wheel.

Another object is to provide an improved construction whereby the tire can be applied to and removed from the rim without the necessity of prying it or otherwise passing it over the edge of the rim.

With the foregoing and other objects in view I have devised a construction as illustrated in the accompanying drawings forming a part of this specification. It is, however, to be understood that I am not limited to the specific construction and arrangement shown, but may use various changes and modifications within the scope of the invention.

Figure 1:
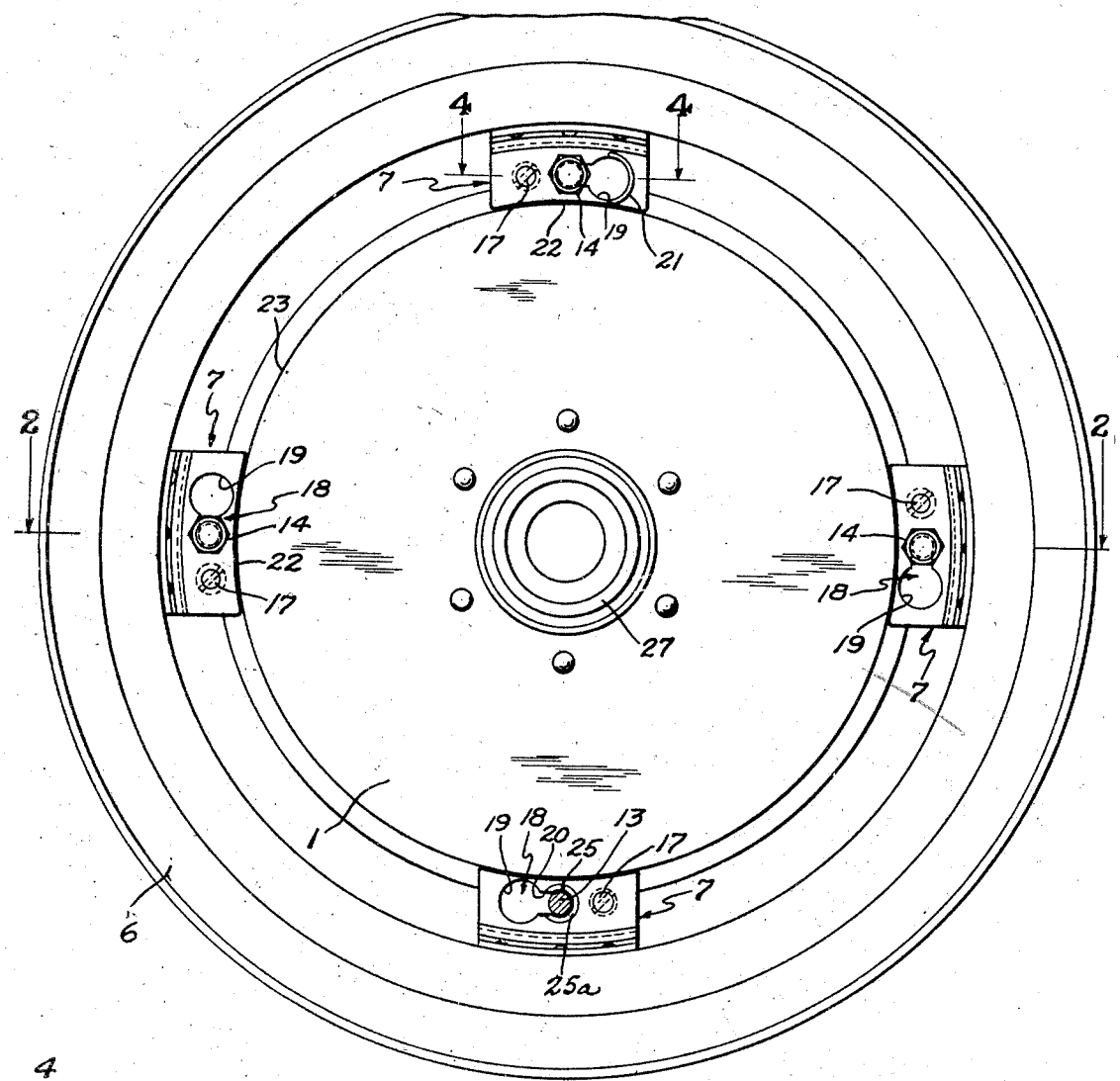
Fig. 1 is a front elevation of a wheel in position on a vehicle, but with the tire omitted.
Figure 2:
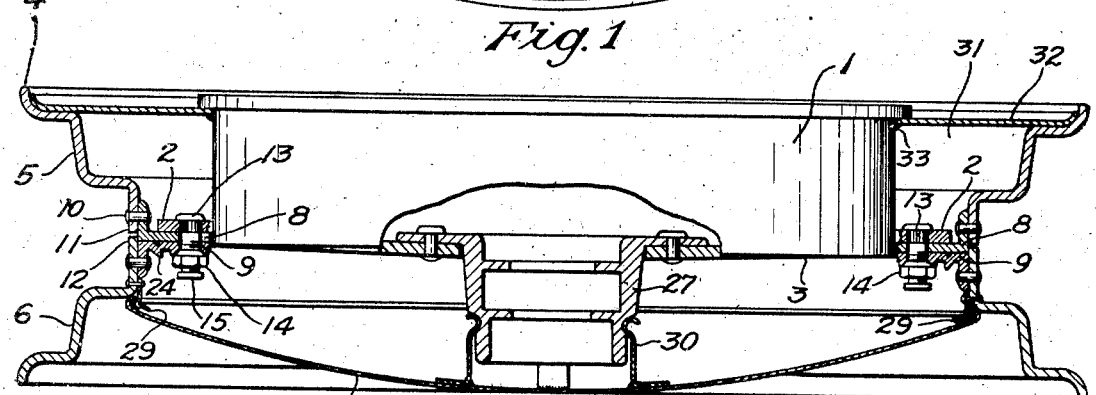
Fig. 2 is a partial transverse section substantially on line 2—2 of Fig. 1.

Figs. 1 and 2 show my improved attaching means arranged so that the brake drum may form the inner or central portion of the wheel with the outer or removable portion detachably mounted thereon, thus doing away with the larger portion of the central disc of the usual removable wheel and therefore greatly reducing the amount of metal required in the wheel, with a resultant material reduction in the weight of the wheel, producing a wheel which consequently can be much more easily handled and may be produced at less cost. In this construction the brake drum is indicated at 1 and on the outer periphery thereof are secured mounting ears 2. These may be formed integral with the drum or may be attached thereto by welding, riveting or other suitable means. In this form shown they project radially outward from the outer periphery of the drum, and are located a short distance inwardly from the outer face 3 thereof so that the outer periphery acts as a guiding means for the removable section to help guide it to proper position on the drum. This outer removable section comprises the rim 4, in the present instance composed of two separable sections 5 and 6, but it is to be understood that the tire is carried on the rim in the usual manner, the showing of the tire in these views being omitted. On the inner sides of the rim are mounting means comprising ears 7 cooperating with the ears 2 for attaching this outer section to the inner section or brake drum 1. The ears may comprise a continuous ring so as to close the space between the ring and the drum 1 or they may be separate ears as shown in the drawings, whichever is preferred, the attaching means being the same in both instances. As the rim is in two sections 5 and 6 the ears 7 also comprise two sections 8 and 9, the section 8 being secured to the section 5 of the rim while the section 9 is secured to the section 6 of the rim. These sections 8 and 9 may be cut and bent from their respective sections of the rim, or they may be separately formed sections attached to their respective sections of the rim by any suitable means, such for example as welding or riveting 10 as shown. Also, as shown one section extends beyond the edge of the rim section so as to overlap the edge of the other rim section and help to keep them in proper alignment. Thus the section 8 extends beyond the edge 11 of the rim section 5 and thus overlaps the edge 12 of the rim section 6 to retain them in alignment.

Figures 15, 16:
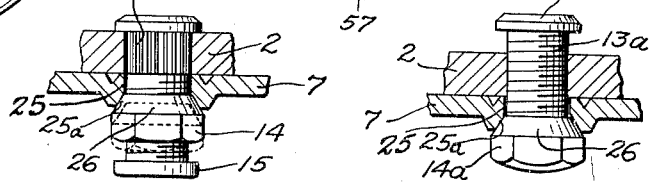
Figs. 15 and 16 are detail sections of slightly different types of attaching means.

For securing the ears 7 to the ears 2 one is provided with locking studs and the other with openings cooperating therewith. In the present showing studs 13 are mounted in the ears 2 and project forwardly therefrom and have nuts 14 thereon. These nuts may be separate and threaded on to the studs as shown in Figs. 2 and 15 or the nut may be an integral part of the stud as shown at 14a in Fig. 16. The action is the same in both cases, except that in the first case the stud is secured to the inner or mounting section 2 with the nut threaded to move thereon, while in the other the stud and integral nut are threaded into the portion 2, but in each case the action of the nut is the same as far as mounting and clamping the removable section is concerned. In both cases there are means to prevent the nut from being detached from the inner or supporting section. Thus as shown in Fig. 15 there is a head 15 on the stud to limit outward movement of the nut and in Fig. 16 the stud has a head 16 for the same purpose.

The two sections 8 and 9 of the ears 7 are arranged in superposed relation, and to hold them together and in assembled relation when detached from the mounting section for handling or carrying as a spare, they are secured together by any desirable securing means, which may be a simple screw 17 passing through one section of the ear and threaded into the other. When mounted on the supporting section of the wheel, however, they are also secured together by the means for securing the removable section to the supporting section, or that is, the studs 13 and 13a and the nut carried thereby. This securing means is arranged so that the removable section of the wheel may be removed and applied without removing the nuts 14 or 14a. For this purpose each ear 7 is provided with an opening 18 having two portions, one enlarged portion 19 to permit passage of the nut 14 or 14a and a second portion 20 leading from one side thereof which is narrower than the diameter of the nut, and preferably of a width approximately the diameter of the stud 13 or 13a. Thus these openings 18, although they may be of different shapes to give the two connected larger and narrower portions, are preferably of approximately keyhole shape, and arranged in a circle corresponding to the location of the studs 13. It will therefore be seen that to apply the removable section to the inner or supporting section all that is necessary is to slip the outer section over the inner section 1 to pass the studs and the nuts thereon through the enlarged portions 19 of the openings, and then turn the outer section either to the right or left, depending on which side the narrower section is located, to carry the studs into the narrower portions 20. Then by clamping or setting up the nuts 14 or 14a the sections are securely locked together, and it will be evident that as the openings 18 pass through both sections 8 and 9 of the ears 7 these clamping nuts 14 and 14a also secure the two sections 5 and 6 of the rim together. The operation of removing the outer or detachable portion of the wheel is merely the reverse of that just described. This comprises loosening the nuts 14 and 14a sufficiently to permit turning of the outer section to bring the studs into the enlarged portion 19 of the openings and then merely withdraw the inner section away from the outer section with the nuts passing through the enlarged portions 19 of the openings. It will be seen that the operation of attaching and detaching is a very simple one, merely involving slipping it over the studs, slightly turning the wheel section, and then setting up the nuts. The reverse operation is used in removing the section. In either case it is not necessary to remove the nuts 14 or 14a with consequent danger of misplacing, or losing, or dropping them into the dirt, or requiring other handling of them.

Figure 4:
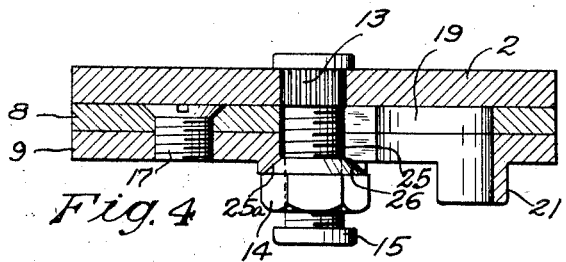
Fig. 4 is a detail section through one of the securing means on an enlarged scale, the section being substantially on line 4—4 of Fig. 1.
Figure 5:
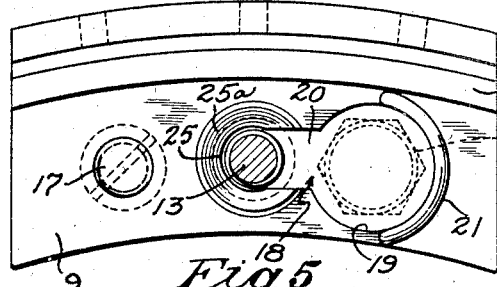
Fig. 5 is a front elevation of the construction of Fig. 4, but with a securing stud in section.

To facilitate removal of the wheel section a stop 21 (Figs. 1, 4 and 5) is provided at the edge of the enlarged portion 19 of the opening opposite to the narrower portion 20 and in alignment with the edge of the portion 19, so that when the removable section is turned to carry the studs into the enlarged portion 19 the nut on this particular stud will engage the stop 21 and prevent further turning movement, and it will stop this movement when all the nuts are in direct alignment with the respective enlarged portions 19. The section can then be drawn off the studs without any trouble. Without this stop the wheel section might be turned too far so as to carry the outer edge of the enlarged portion 19 under the nut so that it would have to again be turned backwardly a short distance to bring the nuts into alignment with this portion. This, of course, could be done, but would require the operator to personally control the wheel to bring the wheel section into position where the nuts are in proper alignment with the openings before withdrawing the wheel. With the stop 21 this aligning action is done automatically without any conscious effect on the part of the operator. Also, as above suggested, since the ears 2 are spaced backwardly from the front face 3 of the drum the inner edges 22 of the ears 7 may ride on the outer periphery 23 of the drum and hold the removable section central to facilitate sliding it over the studs. They also run on the periphery to hold it central during the turning movement. To strengthen and stiffen the sections of the ears 7 they may be provided with laterally pressed ribs 24. Also, to prevent relative turning of the inner and outer sections of the wheel after the nuts 14 and 14a are set up, such for example as a sudden setting of the brakes, cooperating means is provided at the inner end of the narrow portion 20 of the opening and the inner end of the nut to lock the two sections against relative turning when the nuts are set up. This cooperating interlocking means may be of different constructions, but a simple and effective means is that shown in the drawings, in which at the inner end of the narrower portion 20 there is a recess or a seat 25 somewhat wider than the width of portion 20 into which the inner end of the nut 14 or 14a may seat when it is tightened up. It is also preferred that the side walls of this recess be tapered as indicated at 25a and that the inner wall 26 of the nut be correspondingly tapered to seat against the tapered walls of the recess. As this recess extends around the end of the opening to the opposite sides of the narrower portion 20, and as the nut is larger than the width of the portion 20, parts of the recess are carried around the nut to overlap on the inner side thereof toward the enlarged portion 19. Therefore friction alone is not relied on to prevent relative turning of the outer section of the wheel on the inner section, and even should the nuts be slightly loosened there would still be an interlocking action between the nut and this seat to prevent relative turning of the outer section. To permit relative turning of the wheel sections the nuts have to be loosened sufficiently to remove them from the seats 25.

The usual hub 27 may be attached to the front wall 3 of the drum 1 by any suitable means.

After the nuts 14 are properly set up they may be all covered by a removable cap 28 held in place by suitable spring clips 29 fastened to the section 6 and snapping over the inner edges of the cap, and additional spring clips 30 secured to the inner surface of the cap may snap into suitable recesses in the hub. To close the space 31 between the drum and the rim at the rear of the attaching means a sheet metal resilient substantially flat ring 32 may be secured to the drum at 33 and seat at its outer edge in the curve of the rim section 5 as shown in Fig. 2. This closes up the space without interfering with the application and removal of the outer section.

Figure 12:
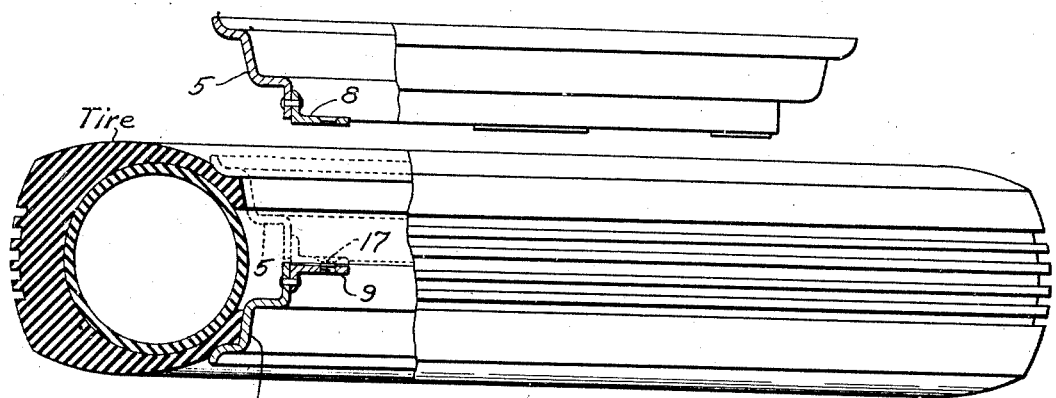
Fig. 12 is a side elevation and partial section of the removable portion of the wheel showing how the tire may be applied and removed.

To remove a tire from this outer section of the wheel all that is necessary is to loosen the nuts 14 and remove the section of the wheel as just described. Then by laying it flat on the floor the screws 17 may be removed, after the tire has been deflated, and then the upper section 5 lifted upwardly as shown in Fig. 12. Then the tire may be lifted from the lower section 6, or this section merely dropped downwardly from the tire. Mounting a tire on the rim is just as simple, and all that is necessary is to apply the two sections 5 and 6 to the opposite sides of the tire and then secure them together by applying the screws 17. The tire can then be inflated as the rim sections will be held together by the screws 17 for handling or carrying as a spare, but when applied to the wheel for use the sections are also firmly held together by the mounting studs and nuts 13, 13a, and 14 and 14a. It will thus be seen that the tire may be easily applied to or removed from the rim without the necessity of prying it over the edge of the rim by the use of tire irons or similar implements.

Figure 3:
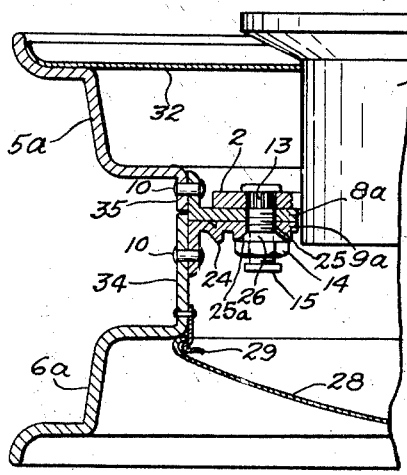
Fig. 3 is a detail section through one side of the wheel showing a somewhat modified arrangement.

The other arrangements shown all use the same principle and a similar construction simply modified for different conditions. For instance in tractor use it is sometimes desirable to change the width of tread, that is the distance between the tires on the opposite wheels. Thus as shown in Fig. 3 the ear sections 8a and 9a corresponding to the sections 8 and 9 of Fig. 1, instead of being in the center of the rim may be spaced to one side thereof. Thus the center portion 34 of the section 6a may be wider than the portion 35 of the section 5a so that the ear sections 8a and 9a are located to one side of the center. Thus when placed on the ears 2 of the drum 1 as shown in Fig. 3 the center of the rim and therefore the tire will be toward the outer face of the drum. If the rim is removed and reversed and again placed on the ears 2 the rim and the tire would be carried inwardly and their centers will be back of the face of the drum, and if this reversing is done for both tires on opposite ends of the axle it will be evident the tread, or the distance between the tires, may be increased or decreased.

Figure 6:
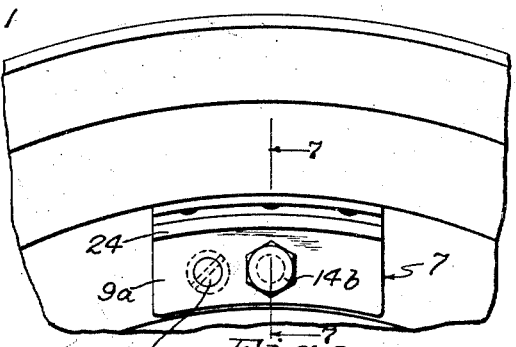
Fig. 6 is a front elevation showing a slightly modified construction.
Figure 7:
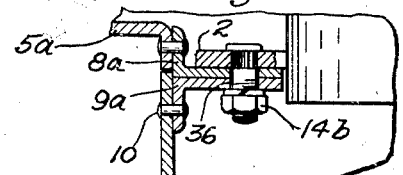
Fig. 7 is a section of the construction of Fig. 6 substantially on line 7—7 of Fig. 6.

This rim in two sections to facilitate applying and removing the tire and with the mounting means for securing them together may be used without the keyhole shaped opening and the non-removable clamping nut of Figs. 1 to 5. Thus in Figs. 6 and 7 the sectional ears 7, instead of being provided with the keyhole shaped opening 18, may have a straight opening 36 through which the stud 13 or 13a may pass, but in this case the nut 14b or the stud of the type of 13a is removable to permit removal of the wheel section, but when in position this clamping stud or nut holds the sections of the tire rim together the same as in the first form.

Figure 8:
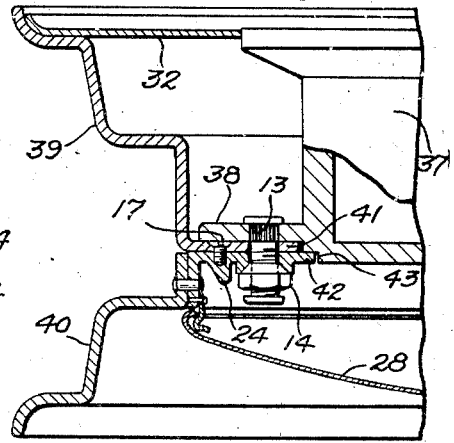
Fig. 8 is a section similar to Fig. 3 showing a modified arrangement.

In Fig. 8 there is a slightly different arrangement in which instead of separate ears on the brake drum 37, this drum is formed with an outwardly extending flange 38 in which the studs 13 or 13a are mounted. The removable section including the rim is made in two sections 39 and 40, and the ears having the elongated opening for cooperating with the stud are shown in overlapped relation at 41 and 42. The sections 41 and 42 instead of being separate ears may be continuous flanges, but the operation is the same as in the other forms and these flanges or ears may be located to one side of the center of the rim as shown to permit changing of the width of the tread as described in connection with Fig. 3. The sections of the rim are held together by the clamping nuts 14 when applied to the wheel as in the other forms, and the sections are secured together by the screws 17 when the section is removed from the drum. The drum may be stepped or recessed as indicated at 43 to cooperate with the inner edges of the flanges or ears 41 and 42 to center the removable section on the drum and assist it getting in the correct position.

Figure 9:
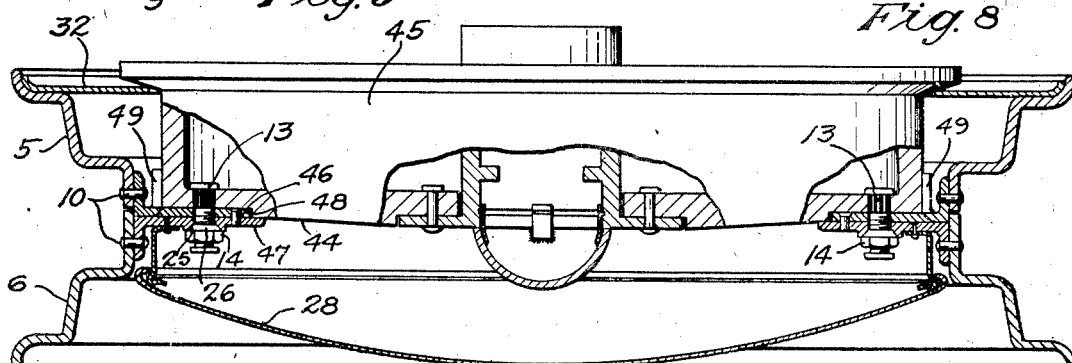
Fig. 9 is a section similar to Fig. 2 showing a modified arrangement.
Figures 10, 11:
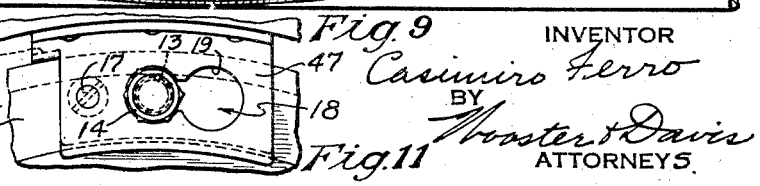
Figs. 10 and 11 are a section and front elevation respectively showing a slightly modified construction.

A similar arrangement is shown in Figs. 9, 10 and 11, except here instead of mounting the studs 13 or 13a on ears or flanges extending outwardly from the outer periphery of the brake drum as in Figs. 1, 3 and 8 these studs project forwardly from the front face 44 of the brake drum 45, and the attaching ears comprising the sections 46 and 47, corresponding to the sections 8 and 9, in which are located the elongated openings 18, overlap the front wall of the brake drum. Otherwise the removable section is secured to the drum in the same manner and by the same operation as previously described. The front wall of the drum may be recessed as shown at 48 to cooperate with the inner edges of the sections 46 to center the removable section on the drum, or the sections 46 may have backwardly extending lugs 49 to engage on the outer periphery of the drum to assist in centering the outer section on the drum and guide it thereon during the limited turning movements.

Figure 13:
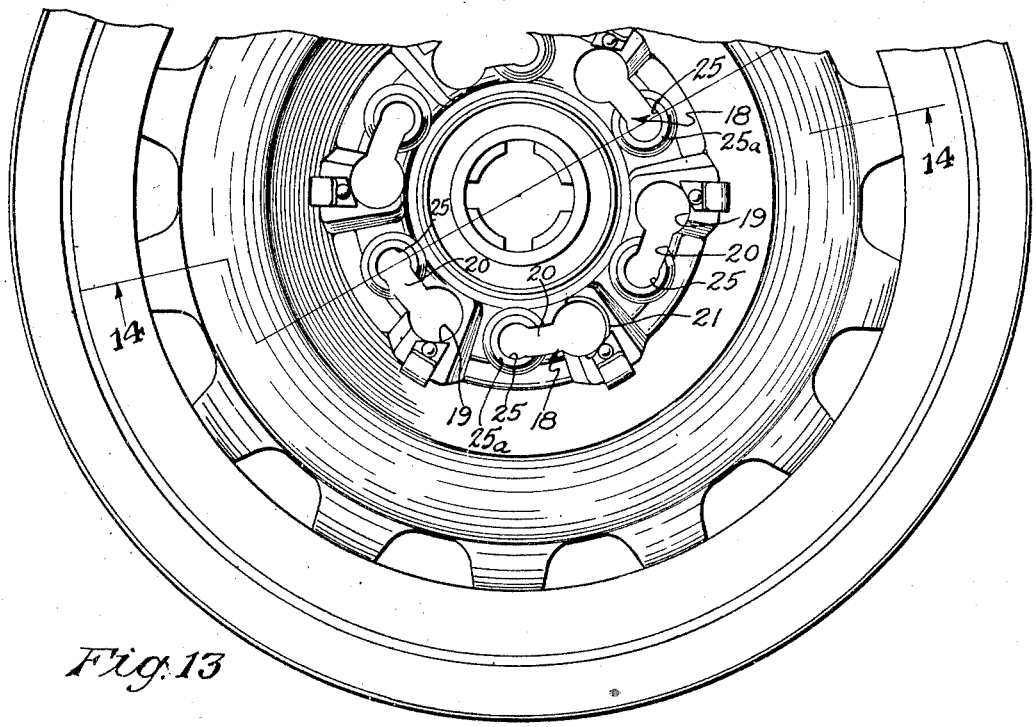
Fig. 13 is a front elevation of the wheel showing a different arrangement of the attaching means.
Figure 14:
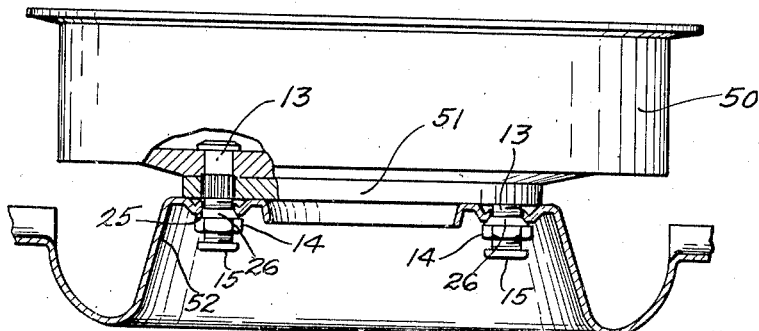
Fig. 14 is a partial edge elevation and a partial section, the section being substantially on line 14—14 of Fig. 13.
Figure 17:
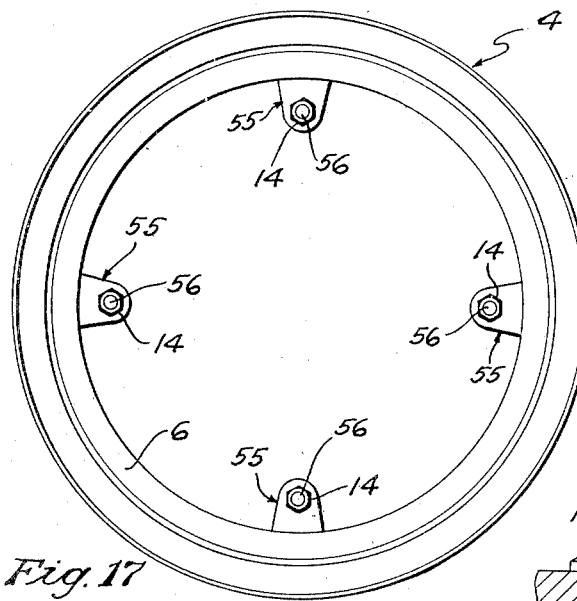
Fig. 17 is a front elevation of the outer section of the wheel showing a slight modification.
Figure 18:
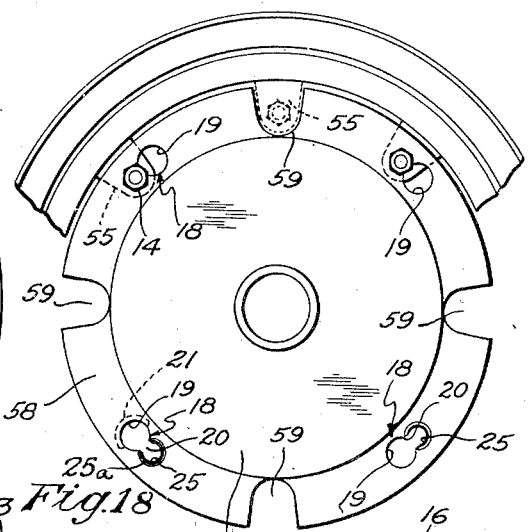
Fig. 18 is a similar view showing how it is attached to the inner section.

In the form shown in Figs. 13 and 14 the same attaching means is provided for attaching a wheel section having a more complete disc to the face of the brake drum. This is similar to the arrangement of Fig. 9, except that the studs 13 or 13a project forwardly from the face of the brake drum 50 near the center thereof, or from the hub plate 51, and the central portion of the rim or rim flange is extended inwardly at 52 and is provided with elongated openings 18 through which the studs extend. These openings 18 have the same enlarged portion 19 for passage of the nuts and the narrower portions 20 having the seats 25 to cooperate with the studs and nuts to lock the wheel against turning on the drum, and mount it thereon as in the forms previously described. The operation of mounting and removing the wheel is the same as in the other forms.

In Figs. 17 to 21 is shown how this improved principle of mounting the removable section of the wheel may be used to secure it either to the back of the supporting drum or disc or on the front thereof as desired. Thus as shown in these figures the rim 4 is made in two sections 5 and 6 the same as in Figs. 1 and 2 and are secured together by the ears 53 and 54 which overlap and form the inwardly extending ears 55. Mounted on one of the sections of these ears, in the present case the section 54, is the securing stud 56. The ear section 53 may be made heavier and thicker to carry this stud, and the stud projects therefrom in opposite directions and from the opposite sides thereof. It is provided with clamping nuts 14, and the stud is provided with a head or flange 15 on each end to prevent removal of the nuts. The ear sections 53 and 54 are also secured together by a screw 17 as in the first form. The brake drum or other supporting central section 57 is provided with a flange 58 extending radially from its outer periphery in which are cut notches 59 of a size to permit passage of the ears 55, or if preferred separate spaced ears corresponding to the ears 2 (Fig. 2) could be used. In this flange 58 between the notches 59, are formed elongated openings 18. If spaced ears like ears 2 are used then the openings 18 are formed in these ears. In either case they are formed in the ears or the flange of the central or mounting section, and these openings 18 are constructed the same as in Figs. 1 and 2 with the enlarged portion 19, the narrow portion 20 and the recessed seat 25. If it is desired to mount the removable section 4 on the rear of the flange 58 this section is placed over the supporting section 57 by passing the ears 55 backwardly through the notches 59, or between ears corresponding to the ears 2 if such are used. The section 4 is then rotated relative to the section 57 to bring the forwardly projecting studs 56 into alignment with the enlarged portion 19 of the openings 18 and then the section 4 drawn forwardly to insert the stud and the nuts 14 thereon through these openings 19. The section 4 is then rotated slightly to carry the studs into the narrower portions 20 and then the nuts 14 are set up in the seats 25, thus locking the removable section to the inner section 57 and also locking it against turning thereon. This is the arrangement shown in Fig. 19. To remove the section 4 all that is necessary is to reverse this operation.

If it is preferred to mount the section 4 on the front of the flange 58 or the ears as specified, the rearwardly extending portions of the studs 56 and the nuts 14 thereon are inserted through the enlarged portions 19 of the opening from the front. The section 4 is then turned to bring these studs into the narrower portions of the openings and the nuts set up to lock it in position. This is the arrangement snown in Fig. 20. In each section the nuts 14 when set up clamp the sections 53, 54 of the ears 5 together and therefore clamp together the two sections 5 and 6 of the rim or removable section 4.

Figure 19:
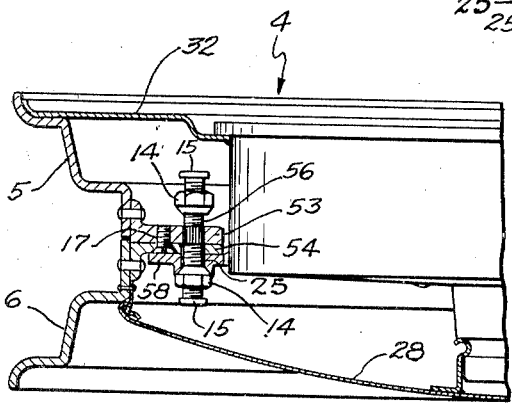
Fig. 19 is a section through one edge of the wheel showing one arrangement of the attaching means of Figs. 17 and 18 as applied.
Figure 20:
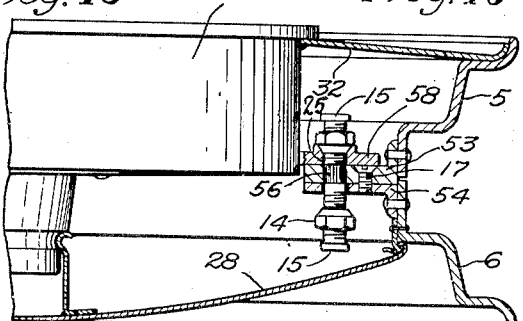
Fig. 20 is a similar view showing another way of using the attaching means of Figs. 17 and 18.
Figure 21:
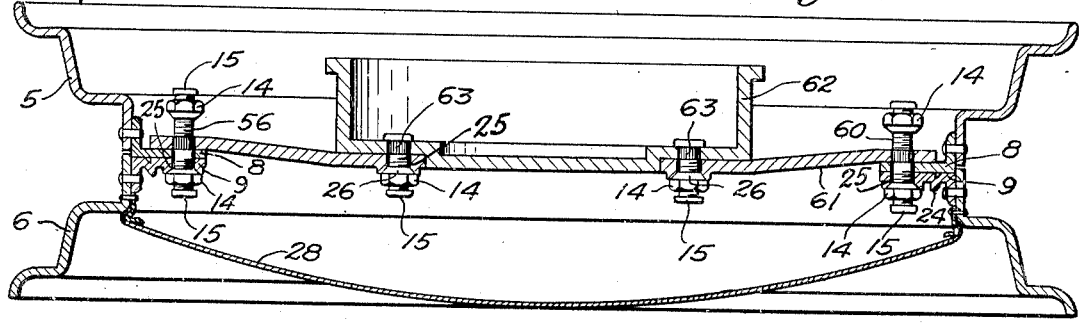
Fig. 21 is a transverse section through a wheel showing how this improved attaching means may be employed for different portions of the wheel.

In Fig. 21 the removable section 4 is the same as in Figs. 1 and 2 but the double stud 60 corresponding to the stud 56 of Figs. 19 and 20 is mounted on the flange 61 of the brake drum 62. This flange 61 may be flange 58 of Fig. 18 integral with the drum or spaced ears 2 as in Fig. 2, and as the stud 60 projects from the opposite sides of the flange the section 4 may be mounted thereon either on the front or the rear side thereof in the same manner as previously described, the flange 61 having notches corresponding to the notches 59 of Fig. 18. However, in the showing of Fig. 21 the disc or flange 61 is shown as a separate member and is offset at its center in which are provided openings of the same shape as the openings 18 to receive these studs 63 mounted on the front wall of the drum 62. Thus not only is the section 4 removably secured on the flange or disc 61 by my improved locking and securing means, but the disc or flange 61 itself is removably mounted in the same way on the front of the brake drum 62. Thus in removing the section 4 for repairing or changing a tire it may be disconnected from the disc or flange 61 in the same manner as the other forms, or the section 4 with the disc 61 may be removed by loosening the nuts on the studs 63. This double mounting arrangement is intended primarily for use in tractors where very large driving wheels are used, and the central disc 61 is dished or offset laterally so that by taking it off and reversing it and then attaching it to the drum the tread or the distance between the wheels may be varied. With the very large wheels commonly used the parts are very heavy and difficult to handle where the central disc and the rim of the tire must be removed and handled as a unit. With the arrangement shown in Fig. 21 the tire and rim portion may first be removed and then the central disc or flange 61 may be removed and reversed and again applied to the drum 62. After this the rim section may again be applied to the disc or flange 61, thus greatly facilitating the operation of reversing the wheels.

It will be seen from the above that in the various applications and arrangement shown the same type of securing and locking means is used for mounting the removable section on the supporting or stationary inner section, and that the same basic construction is used in each form, and the same operation of removing and applying the detachable section is employed in all of the arrangements. This involves merely loosening of the clamping nuts to remove them from the recessed seat, then turning the removable section a short distance permitting it to be easily removed from the mounting section. The operation of remounting is just as simple and as quickly performed. Also, in each instance the sections are effectively locked together against relative turning movements. It is not necessary to remove the studs or nuts, and therefore they do not require handling to soil the hands or clothes, and there is no danger of their being lost or misplaced or dropped into the dirt so that they would have to be cleaned before use. Also, that the clamping studs or nuts secure the two sections of the rim or removable section together when they are on the wheel, but that the rim sections may be easily separated for applying or removing the tire without the necessity of using tire irons to pry it over the edges of the rim.

Having thus set forth the nature of my invention, what I claim is:

1. In a vehicle wheel, a supporting section having a circular shoulder, studs mounted on said section extending parallel to the axis thereof and arranged in a circle, a clamping nut on each stud, a removable section having inwardly extending ears each having an opening comprising an enlarged portion for passage of a nut and a narrower portion leading from one side thereof, said section being mountable on the first section by passing the nuts through said enlarged portions and then turning the section to locate the studs in the narrower portions, and rearwardly extending lugs on the ears located to cooperate with said shoulder to center and guide the removable section during the turning movements.

2. In a vehicle wheel, an inner supporting section having spaced flange sections, an outer removable section having inwardly extending spaced flange sections of a width less than the distance between the first flange sections so that the flange sections on the removable wheel sections may be passed to the rear of the first flange sections and then turned to bring the two sets of flange sections into overlapping relation, one set of flange sections having openings therethrough, studs on the other set of flange sections having nuts adapted to pass through the openings in the first flange sections, said openings each having an enlarged portion for passage of the nuts and a narrower portion leading from one side thereof to receive the studs on relative turning movements between the sections.

3. In a vehicle wheel, an inner supporting section, studs mounted on said section, securing nuts threaded on the studs, means to prevent removal of the nuts from the studs, a removable section of the wheel comprising rim sections including spaced side flanges and which are laterally separable to permit removal of a tire, inwardly projecting members on the respective rim sections with the members on one rim section overlapping corresponding members of the other rim section, the said members on one rim section extending beyond the inner edge of said section and overlapping the inner edge of the other rim section to retain the rim sections in alignment, each pair of said overlapping members having aligned substantially keyhole shaped openings and said aligned openings being spaced to correspond with the spacing of the studs, the larger portion of said openings being of a size to permit passage of said nuts and the narrower portion being of a width substantially that of the studs to receive the studs to permit the nuts to clamp the rim sections together and to the supporting section, and there being a depressed seat for the inner end of the nut on a stud at the end of the narrower portion to receive the nut and prevent turning of the removable section relative to the inner section.

4. In a vehicle wheel, a supporting section, a removable section comprising rim sections including spaced side flanges and which are laterally separable to permit removal of a tire, inwardly projecting members on the respective rim sections with the members of one rim section overlapping corresponding members of the other rim section, the said members on one rim section extending beyond the inner edge of said section and overlapping the inner edge of the other rim section to retain the rim sections in alignment, said overlapping members having a plurality of substantially keyhole shaped openings arranged in a circle with the openings in each overlapping pair of members being in alignment, studs provided with nuts having threaded connection with the first section, the larger portion of said openings being of a diameter to permit passage of said nuts therethrough and the narrower portion being of less width than said nuts to receive the studs to permit the nuts to clamp the rim sections together and to the supporting section, and recessed seats at the end of the narrower portions for the nuts to seat in to prevent relative rotation of the removable and supporting sections.

5. In a vehicle wheel, a supporting section, a removable section comprising rim sections including spaced side flanges and which are laterally separable to permit removal of a tire, inwardly projecting members on the respective rim sections with the members of one rim section overlapping corresponding members of the other rim section, the said members on one rim section extending beyond the inner edge of said section and overlapping the inner edge of the other rim section to retain the rim sections in alignment, said overlapping members having a plurality of substantially keyhole shaped openings arranged in a circle with the openings in each overlapping pair of members being in alignment, a series of studs on the first section located to pass into said openings and having nuts thereon, the larger portion of the openings being of a size to permit passage of the nuts and the narrower portions being of a width substantially that of the studs to permit the openings to be slid onto the studs and then the removable section turned to bring the studs into the narrower portions of the openings to permit the nuts to clamp the rim sections together and to the supporting section, tapered seats at the ends of said narrower portions of the openings, and the inner ends of the nuts being tapered to seat in said seats and prevent turning of the removable section in the opposite direction.

6. In a vehicle wheel, an inner supporting section, a removable outer section comprising rim sections including spaced side flanges and which are laterally separable to permit removal of a tire, inwardly projecting members on the respective rim sections with the members on one rim section overlapping the corresponding members on the other rim section, the members on one rim section extending beyond the inner edge thereof and overlapping the inner edge of the other rim section to retain the sections in alignment, said overlapping members having a plurality of openings therein arranged in a circle with the openings in each overlapping pair of members being in alignment, a plurality of studs on the inner section having nuts thereon and arranged to correspond with the arrangement of the said openings, said openings each comprising a portion of a size to permit passage of the nuts and a narrower portion leading from one side thereof, said outer section being adapted for attachment to the inner section by sliding said larger portions of the openings over the nuts onto the studs and then turning in the plane of the section to bring the studs into the narrower portions of the openings for clamping of the rim sections together and to the supporting section by the nuts, and cooperating holding means on the inner section at the outer ends of said narrower portions and on the inner ends of the nuts to lock the outer section against turning in the opposite direction when the nuts are tightened.

7. In a vehicle wheel, an inner supporting section, a removable outer section including a tire carrying rim comprising rim sections including spaced side flanges and circumferentially separable between the flanges, inwardly projecting ears on each of the separable rim sections with the ears on one rim section overlapping the ears on the other rim section when in assembled relation, the ears on one rim section extending beyond the inner edge of the said section to overlap the other rim section and retain the rim sections in alignment, means for securing the overlapped ears together and removable while the overlapping ears are in normal relation to permit separation of the rim sections, aligned substantially keyhole shaped transverse openings through said overlapped ears, studs on the supporting section passing through said openings, and nuts on the studs to clamp said ears to the support and also hold the rim sections against separating.

8. In a vehicle wheel, an inner supporting section, a removable outer section including a tire carrying rim comprising spaced side flanges which are laterally separable on a line between the flanges to permit removal of a tire, inwardly projecting overlapping members on the respective flanges having transverse substantially keyhole shaped openings therethrough, the members on one flange extending beyond the inner edge of said flange section and overlapping the inner edge of the other flange to retain the flanges in alignment, studs on the inner section to pass through said openings, and nuts on the studs to clamp said members to the inner section to mount the outer section thereon and at the same time secure the rim sections against separating, the larger portions of said openings being of a size to permit passage of the nuts and the narrower portions being narrower than said nuts.

9. In a vehicle wheel, an inner supporting section, studs mounted on said section extending parallel to the axis of the wheel, securing nuts on the studs, a removable section of the wheel comprising rim sections including spaced side flanges and which are laterally separable to permit removal of a tire, inwardly projecting members on each of the respective rim sections overlapping corresponding members of the other section, the members on one rim section extending beyond the inner edge of said section and overlapping the inner edge of the other rim sections to retain the rim sections in alignment, said overlapping members on the respective rim sections having a plurality of openings arranged and spaced to correspond with the spacing of the studs, each opening having an enlarged portion to permit passage of a nut and a narrower portion leading from one side thereof of a width equal to substantially the diameter of the stud to permit clamping of the rim sections together and to the supporting section by the nuts, and cooperating means on the removable section at the ends of the narrower portions of the openings and on the inner ends of the nuts to lock the said section against turning relative to the supporting section.

10. In a vehicle wheel, an inner supporting section, a removable outer section including a tire carrying rim comprising rim sections including spaced side flanges and which are laterally separable on a line between the flanges to permit removal of a tire, inwardly projecting overlapping members on the respective rim sections, the members on one rim section extending beyond the inner edge of said section and overlapping the inner edge of the other rim section to retain the rim sections in alignment, certain of said overlapping members having aligned transverse substantially keyhole shaped openings therethrough, studs on the inner section to pass through said openings, and nuts on the studs to clamp said members to the inner section to mount the outer section thereon and also to clamp the rim sections together.

11. In a vehicle wheel, a removable outer section including a tire carrying rim comprising rim sections including spaced side flanges and circumferentially separable on a line between the flanges, inwardly projecting members on the respective separable rim sections with members on one rim section overlapping members on the other rim section when in assembled relation, the members on one rim section extending beyond the edges of the said section to overlap the other rim section and retain the rim sections in alignment, means for securing the overlapped members together and removable to permit separation of the separate rim sections, and transverse substantially keyhole shaped openings through at least a portion of said overlapped members for passage of studs on an inner supporting section to mount the outer section thereon and also clamp the rim sections together.

CASIMIRO FERRO.